(Model.)

W. TORY.
HOOF SPREADING HORSESHOE.

No. 448,736. Patented Mar. 24, 1891.

Witnesses.
A. Ruppert,
H. A. Daniels

Inventor.
Wm Tory
Per
Thomas P. Simpson
Atty

UNITED STATES PATENT OFFICE.

WILLIAM TORY, OF GUYSBOROUGH, CANADA.

HOOF-SPREADING HORSESHOE.

SPECIFICATION forming part of Letters Patent No. 448,736, dated March 24, 1891.

Application filed May 29, 1890. Serial No. 353,663. (Model.)

*To all whom it may concern:*

Be it known that I, WILLIAM TORY, a subject of the Queen of Great Britain, residing at Guysborough, in the county of Guysborough and Province of Nova Scotia, in the Dominion of Canada, have invented a Hoof-Spreading Horseshoe; and I do hereby declare the following to be a full, clear, and exact description of the invention, such as will enable others skilled in the art to which it appertains to make and use the same.

The special object of the invention is to make a hoof and shoe spreader for horses whereby contracted feet may be relieved and cured.

The invention will first be described in connection with the drawings, and then pointed out in the claim.

Figure 1:
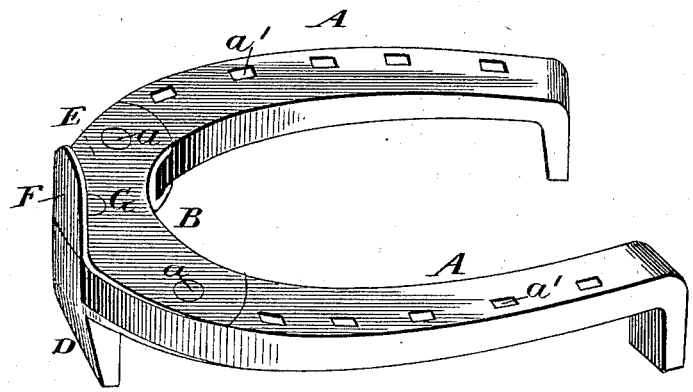
Figure 2:
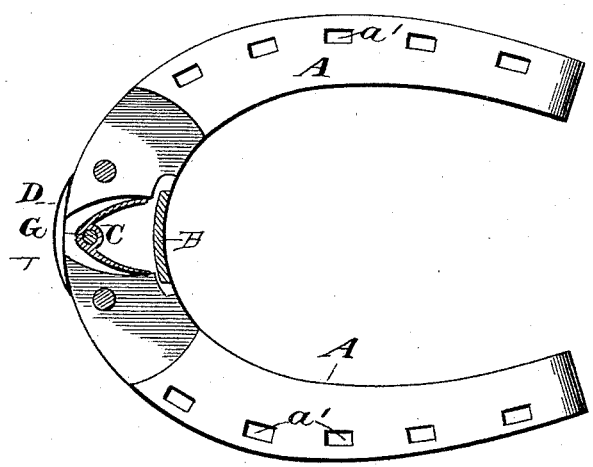
Figure 3:
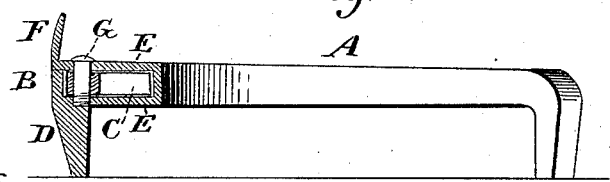

Figure 1 of the drawings is a perspective view, Fig. 2 a plan view, and Fig. 3 a median longitudinal vertical section.

In the drawings I show a shoe of the usual shape, but made in three pieces A B A, connected by the two pivots $a$ $a$. The sides A A are provided with five nail-holes $a'$, by which they may be nailed to the hoof. Two of these holes are made very near the rear ends or heels of the side pieces, so as to give the expanding-spring C greater power over the hoof and adapt the strength of spring to the requirements of the hoof for its expansion.

I make the toe-calk D, hinge-plates E, and clip F, which taken together constitute the piece B, all in one piece and so arrange them as to cover the opposing ends of the pieces A A. The plates E are placed one above the other and connected by the two hinge bolts or pivots $a$ $a$.

In the central shoe-section B, between the two plates E E, I secure the two-armed spring C by means of a bolt G, screwed through the upper plate directly over the middle of the toe-calk and through the middle of the spring.
Each prong or arm of the spring presses against one side A of the shoe, so as to tend to throw the heels outwardly.

The clip F fits over the end of the hoof in order to secure the front part of the shoe more firmly to the animal's hoof, the nails being set back to free the hinge-joint.

The plates are so shaped where they approach the convex and concave edges of the shoe as to prevent clay or other substances from getting into the joints.

The recess or open space between the front ends of the sides of the shoe and the plates E E is for the reception of the expanding-spring, one of whose legs bears against the end of each shoe side. The spring is pivoted at its crotch or middle nearly or quite in line with the pivots of the shoe sides. If the plates E E, calk D, and clip F were in separate pieces jointed together, the impact of travel would soon loosen some of these joints and the shoe sides would not work properly on their pivots. The plates E E are shaped so as to cover the spring and space between the pivoted ends of the shoe sides, so as to effectually prevent clay, sand, grit, or other matter from getting between the jointed ends of shoe and the plates. It will be perceived that the upper plate E carries the clip F, while the lower plate E has the calks D, making solid where the impact and wear come.

The plates and calk being in one piece, the hinge-joint is a very strong one, while the toe-calk is also strengthened, as the horse's weight on the upper plate binds the joints together, while perfect freedom of action is left to the hinge-joints and to the spring.

In the event of a very thin hoof where the pressure of the spring will be too great, the last nail at each heel of the sides A may be omitted or withdrawn. By this means the pressure may be always adapted to the requirements of the hoof. It will be observed that the integrally-connected plates E E cover the joints of the shoe at top, bottom, and rear, while the calk and clip form a close joint in front of the shoe.

I am aware that it is not new to divide a horseshoe in front and then pivot them (the parts) together on a lap-joint or to an intermediate piece, also to use a two-pronged spring pressing outwardly on the inside of the shoe; but

What I claim as new is—

The plates E E, integrally connected at the rear and provided in front with the calk D and clip F, in combination with the two pivoted sections A A and the two-armed spring C, the latter held by a pivot G in the space between the plates E E and sections A A, substantially as shown and described.

In testimony whereof I affix my signature in presence of two witnesses.

WILLIAM TORY.

Witnesses:
JOHN CONNOLLY,
DANIEL K. TORY.